(12) United States Patent
Umemoto et al.

(10) Patent No.: US 6,174,628 B1
(45) Date of Patent: Jan. 16, 2001

(54) ELECTROLYTE CONTAINING DIHALODICARBONYL COMPOUNDS AND ELECTRIC ENERGY GENERATOR USING SAME

(75) Inventors: Teruo Umemoto; Masayuki Harada; Kenji Adachi, all of Tsukuba (JP)

(73) Assignee: Daikin Industries, Ltd., Osaka (JP)

( * ) Notice: Under 35 U.S.C. 154(b), the term of this patent shall be extended for 0 days.

(21) Appl. No.: 09/230,347

(22) Filed: Jan. 25, 1999

(30) Foreign Application Priority Data

Jun. 13, 1997 (JP) .................................................. 9-157215

(51) Int. Cl.⁷ ................................................... H01M 10/26
(52) U.S. Cl. ........................... 429/324; 429/306; 429/336
(58) Field of Search ..................................... 429/324, 336, 429/207, 306

(56) References Cited

U.S. PATENT DOCUMENTS 4,950,367 * 8/1990 Dapperheld et al. .................. 204/59

FOREIGN PATENT DOCUMENTS

| 6-267589 | 9/1994 | (JP) | H01M/10/40 |
| 6-267590 | 9/1994 | (JP) | H01M/10/40 |
| 8-148159 | 6/1996 | (JP) | H01M/6/16 |

* cited by examiner

*Primary Examiner*—Maria Nuzzolillo
*Assistant Examiner*—M. Wills
(74) *Attorney, Agent, or Firm*—Sughrue, Mion, Zinn, Macpeak & Seas, PLLC

(57) ABSTRACT

An electrolyte containing at least one of dihalodicarbonyl compounds, in which hydrogen atoms of a methylene group between the two carbonyl groups are substituted with halogen atoms, and an electric energy generator comprising the electrolyte, an active material for positive electrode and an active material for negative electrode. The electrolyte has high polarity, high resistance to oxidation and flame retardance, and thus possesses excellent characteristics as the electrolyte for electric energy generators.

6 Claims, 4 Drawing Sheets

8

US 6,174,628 B1

ELECTROLYTE CONTAINING DIHALODICARBONYL COMPOUNDS AND ELECTRIC ENERGY GENERATOR USING SAME

This application is a 371 PCT/JP98/01353.

TECHNICAL FIELD

The present invention relates to an electrolyte used for an electric energy generator and the electric energy generator.

BACKGROUND ART

An electric energy generator is indispensable in the modern industrialized society, and particularly in recent years, attention has been paid to a lithium battery or lithium ion battery which employs a compound containing lithium element on its negative electrode or positive electrode as a high performance battery from the viewpoints of its high voltage and high energy density.

A basic function of an electrolyte which is one of important battery components is to transport ions in an electric energy generating reaction (electrochemical reaction). Examples of characteristics required for the electrolyte used on high performance batteries are excellent ion transporting capability, high resistance to oxidation, flame retardance, improvement in charge and discharge cycle of secondary batteries and prevention of dendrite of lithium metal in charging.

As the electrolytes which are known to be suitable for high performance batteries, there are organic compounds such as ethylene carbonate, propylene carbonate, dimethyl carbonate, diethyl carbonate, and γ-butyrolactone.

However electrolytes which have been used hitherto do not satisfy the characteristics mentioned above. Though a battery having high electromotive force which employs a N-fluoropyridinium salt as an active material for positive electrode has been proposed (JP-A-7-6756), when a conventional electrolyte is used, there are problems that battery deteriorations such as lowering of discharge voltage and lowering of discharge capacity occur under high temperature condition.

Accordingly, since high polarity generates excellent ion transporting capability and the above-mentioned known compound for electrolytes contains, in its molecule, only one carbonyl group which is a polar functional group having electron attractive property and represented by:

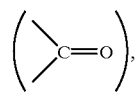

the present inventors have expected that the above-mentioned problems can be solved by using, as an electrolyte, a dicarbonyl compound having two carbonyl groups in its molecule, and have challenged to use a dicarbonyl compound having the basic structural formula (II):

(II)

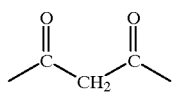

However as shown in the following reaction scheme (1):

(1)

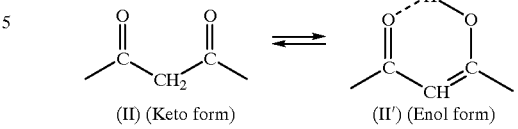

(II) (Keto form)    (II') (Enol form)

since the dicarbonyl compound represented by the basic structural formula (II) exists both in keto form (II) and enol form (II') at equilibrium, when used as an electrolyte, there is a fatal defect such that the enol form of the dicarbonyl compound reacts with a metal such as lithium of a negative electrode to generate hydrogen gas.

As a result of intensive study, the present inventors have found that when hydrogen atoms of the methylene group in the above-mentioned dicarbonyl compound are substituted with halogen atoms having strong electron attractive property, the resulting dicarbonyl compound does not become enol form, and thus the above-mentioned problem of hydrogen generation by reacting with a metal such as lithium can be solved. Further the present inventors have found that by introducing halogen atoms, the dicarbonyl compound can be stabilized and endowed with flame retardance and high resistance to oxidation.

Namely an object of the present invention is to obtain an electrolyte which has high polarity, high resistance to oxidation and flame retardance and is suitable for an electric energy generator to improve charge and discharge cycle and inhibit dendrite of metal lithium. Another object of the present invention is to obtain an electrolyte suitable for a battery in which N-fluoropyridinium salt is used as an active material for positive electrode having a high electromotive force.

DISCLOSURE OF THE INVENTION

The present invention relates to the electrolyte which contains at least one selected from the group consisting of dihalodicarbonyl compounds represented by the formula (I):

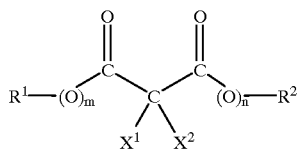

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1, and the formula (I'):

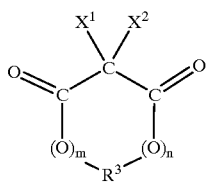

wherein $X^1$ and $X^2$ are the same or different halogen atoms, $R^3$ is an alkylene chain or haloalkylene chain having 1 to 6 carbon atoms which contains or does not contain oxygen atom in its chain, each of m and n is independently 0 or 1.

It is preferable that the above-mentioned electrolyte is used for an electric energy generator, in which an active material for negative electrode is a metal, metal alloy, metal oxide, carbonaceous material or organic polymer.

Also it is preferable that the above-mentioned electrolyte is used for an electric energy generator, in which an active material for positive electrode is a metal oxide, metal chalcogenide, metal halogenide, carbonaceous material, organic polymer or compound having N—F bond.

Further it is preferable that the above-mentioned electrolyte contains a lithium salt as a solute.

Further the present invention relates to the electric energy generator which comprises an active material for positive electrode, an active material for negative electrode and an electrolyte containing at least one selected from the group consisting of dihalodicarbonyl compounds represented by the formula (I):

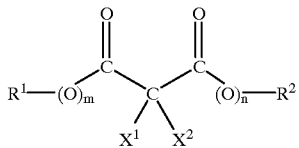

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1, and the formula (I'):

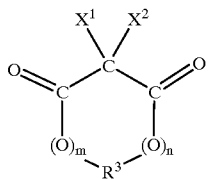

wherein $X^1$ and $X^2$ are the same or different halogen atoms, $R^3$ is an alkylene chain or haloalkylene chain having 1 to 6 carbon atoms which contains or does not contain oxygen atom in its chain, each of m and n is independently 0 or 1.

BEST MODE FOR CARRYING OUT THE INVENTION

Figure 1:
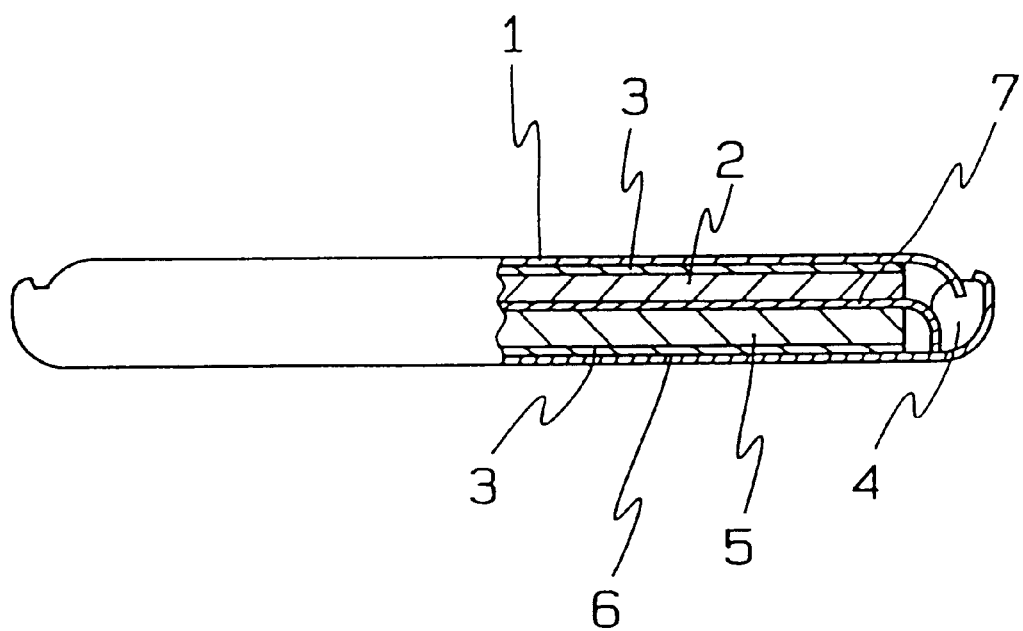
FIG. 1 is a diagrammatic partial cross-sectional view of the battery produced in Example of the present invention.

The present invention relates to the electrolyte which contains at least one selected from the group consisting of dihalodicarbonyl compounds represented by the formula (I):

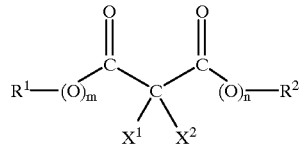

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1, and the formula (I'):

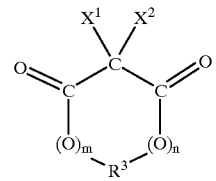

wherein $X^1$ and $X^2$ are the same or different halogen atoms, $R^3$ is an alkylene chain or haloalkylene chain having 1 to 6 carbon atoms which contains or does not contain oxygen atom in its chain, each of m and n is independently 0 or 1.

In the above-mentioned formula (I) or (I'), examples of the halogen atom of $X^1$ and $X^2$ are fluorine, chlorine, bromine or iodine. In order to obtain good effect of polarity and maintain low melting point and low viscosity, fluorine or chlorine atom is preferable, and fluorine atom is particularly preferable.

$R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, and each of m and n is independently 0 or 1.

The preferred alkyl group represented by $R^1$ and $R^2$ is a lower alkyl group having 1 to 4 carbon atoms from the viewpoint of not lowering such a high polarity of the molecule as far as possible, and examples thereof are methyl, ethyl, propyl, butyl and the like.

The preferred haloalkyl group represented by $R^1$ and $R^2$ is a lower haloalkyl group having 1 to 4 carbon atoms from the viewpoint of not lowering such a high polarity of the molecule as far as possible, and examples thereof are $CH_2F$, $CHF_2$, $CF_3$, $CH_2Cl$, $CHCl_2$, $CCl_3$, $CH_2Br$, $CHBr_2$, $CBr_3$, $CH_2I$, $CHI_2$, $CI_3$, $C_2H_4F$, $C_2H_4Cl$, $C_2F_4H$, $C_2F_5$, $C_3H_6F$, $C_3H_6Cl$, $C_3F_6H$, $C_3F_7$, $C_4H_8F$, $C_4H_8Cl$, $C_4F_9$, and the like.

The preferred alkoxyalkyl group represented by $R^1$ and $R^2$ is a lower alkoxyalkyl group having 2 to 4 carbon atoms from the viewpoint of not lowering such a high polarity of the molecule as far as possible, and examples thereof are $CH_3OCH_2$, $C_2H_5OCH_2$, $C_3H_7OCH_2$, $CH_3OCH_2CH_2$, $CH_3OCH_2CH_2CH_2$, $CH_3OCH_2CH(CH_3)$, $C_2H_5OCH_2CH_2$, and the like.

The preferred haloalkoxyalkyl group represented by $R^1$ and $R^2$ is a lower haloalkoxyalkyl group having 2 to 4 carbon atoms from the viewpoint of not lowering such a high polarity of the molecule as far as possible, and examples thereof are $FCH_2OCH_2$, $ClCH_2OCH_2$, $CH_3OCHF$, $CF_3OCF_2$, $CCl_3CH_2OCH_2$, $CF_3CH_2OCH_2$, $CF_2HCF_2OCH_2$, $CF_3CH_2OCH_2CH_2$, $CF_3CFHCF_2OCH_2$, and the like.

The preferred aryl-substituted alkyl group represented by $R^1$ and $R^2$ is an aryl-substituted alkyl group having 7 to 8 carbon atoms from the viewpoint of not lowering such a high polarity of the molecule as far as possible, and examples thereof are $C_6H_5CH_2$, $C_6H_5CH_2CH_2$, $CH_3C_6H_4CH_2$, and the like.

The preferred haloaryl-substituted alkyl group represented by $R^1$ and $R^2$ is a haloaryl-substituted alkyl group having 7 to 8 carbon atoms from the viewpoint of not lowering such a high polarity of the molecule as far as possible, and examples thereof are $FC_6H_4CH_2$, $ClC_6H_4CH_2$, $BrC_6H_4CH_2$, $FC_6H_4CH_2CH_2$, and the like.

The preferred aryl group represented by $R^1$ and $R^2$ is an aryl group having 6 to 8 carbon atoms from the viewpoint of not lowering such a high polarity of the molecule as far as possible, and examples thereof are $C_6H_5$, $CH_3C_6H_4$, $CH_3CH_2C_6H_4$, $(CH_3)_2C_6H_3$, and the like.

The preferred haloaryl group represented by $R^1$ and $R^2$ is a haloaryl group having 6 to 8 carbon atoms from the viewpoint of not lowering such a high polarity of the molecule as far as possible and examples thereof are $FC_6H_4$, $F_2C_6H_3$, $ClC_6H_4$, $Cl_2C_6H_3$, $BrC_6H_4$, $IC_6H_4$, $F(CH_3)C_6H_3$, $F(CH_3)_2C_6H_2$, and the like.

$R^3$ of the formula (I') is an alkylene chain or haloalkylene chain having 1 to 6 carbon atoms which may contain or may not contain oxygen atom in its chain.

The preferred alkylene chain represented by $R^3$ which may contain or may not contain oxygen atom in its chain is an alkylene chain having 1 to 5 carbon atoms which may contain or may not contain oxygen atom in the chain thereof from the viewpoint of not lowering such a high polarity of the molecule as far as possible, and examples thereof are $CH_2$, $CH(CH_3)$, $C(CH_3)_2$, $CH_2CH_2$, $CH(CH_3)CH_2$, $C(CH_3)_2CH_2$, $CH_2OCH_2$, $CH(CH_3)CH(CH_3)$, $CH_2CH_2CH_2$, $CH_2C(CH_3)_2CH_2$, $CH_2CH_2CH_2CH_2$, $CH_2CH_2OCH_2CH_2$, $CH_2CH_2CH_2CH_2CH_2$, and the like.

The preferred haloalkylene chain represented by $R^3$ which may contain or may not contain oxygen atom in its chain is a haloalkylene chain having 1 to 5 carbon atoms which may contain or may not contain oxygen atom in the chain thereof from the viewpoint of not lowering such a high polarity of the molecule as far as possible, and examples thereof are $CHF$, $CF_2$, $CH(CF_3)$, $C(CF_3)_2$, $CHCl$, $CCl_2$, $CHBr$, $CBr_2$, $CHI$, $CI_2$, $CH(CF_3)CH_2$, $CH_2CF_2CH_2$, $CF_2OCF_2$, $CF_2OCH_2$, $CH_2CF_2CF_2CH_2$, $CH_2CF_2CF_2CF_2CH_2$, and the like.

Further nonrestricted examples of the compound represented by the above formula (I) or (I') are those having the combinations of $X^1$, $X^2$, $R^1$, $R^2$, $R^3$, m and n shown in Tables 1 to 4.

TABLE 1

| Compound No. | $X^1$ | $X^2$ | $R^1$ | $R^2$ | m | n |
|---|---|---|---|---|---|---|
| 1 | F | F | $CH_3$ | $CH_3$ | 0 | 0 |
| 2 | F | F | $C_2H_5$ | $CH_3$ | 0 | 0 |
| 3 | F | F | $C_2H_5$ | $C_2H_5$ | 0 | 0 |
| 4 | F | F | $C_3H_7$ | $C_3H_7$ | 0 | 0 |
| 5 | F | F | $C_4H_9$ | $C_4H_9$ | 0 | 0 |
| 6 | Cl | F | $CH_3$ | $CH_3$ | 0 | 0 |
| 7 | Cl | Cl | $CH_3$ | $CH_3$ | 0 | 0 |
| 8 | Br | Br | $CH_3$ | $CH_3$ | 0 | 0 |
| 9 | Br | F | $CH_3$ | $CH_3$ | 0 | 0 |
| 10 | Br | Cl | $CH_3$ | $CH_3$ | 0 | 0 |
| 11 | I | I | $CH_3$ | $CH_3$ | 0 | 0 |
| 12 | I | Cl | $CH_3$ | $CH_3$ | 0 | 0 |
| 13 | I | Br | $CH_3$ | $CH_3$ | 0 | 0 |
| 14 | I | F | $CH_3$ | $CH_3$ | 0 | 0 |
| 15 | F | F | $CH_3$ | $CH_3$ | 1 | 0 |
| 16 | F | Cl | $CH_3$ | $CH_3$ | 1 | 0 |
| 17 | Cl | Cl | $CH_3$ | $CH_3$ | 1 | 0 |
| 18 | F | F | $CH_3$ | $C_2H_5$ | 1 | 0 |
| 19 | F | F | $CH_3$ | $CH_3$ | 1 | 1 |
| 20 | F | F | $C_2H_5$ | $CH_3$ | 1 | 1 |
| 21 | F | F | $C_2H_5$ | $C_2H_5$ | 1 | 1 |
| 22 | F | F | $CH_2CF_3$ | $CH_3$ | 1 | 1 |
| 23 | F | F | $CH_2CF_3$ | $CH_2CF_3$ | 1 | 1 |
| 24 | F | Cl | $CH_3$ | $CH_3$ | 1 | 1 |
| 25 | Cl | Cl | $CH_3$ | $CH_3$ | 1 | 1 |
| 26 | Br | Br | $CH_3$ | $CH_3$ | 1 | 1 |
| 27 | Br | F | $CH_3$ | $CH_3$ | 1 | 1 |
| 28 | F | F | $CH_2OCH_3$ | $CH_3$ | 0 | 0 |
| 29 | F | F | $CH_2OCH_3$ | $C_2H_5$ | 0 | 0 |
| 30 | F | F | $CH_2OC_2H_5$ | $CH_3$ | 0 | 0 |

TABLE 2

| Compound No. | $X^1$ | $X^2$ | $R^1$ | $R^2$ | m | n |
|---|---|---|---|---|---|---|
| 31 | F | Cl | $CH_2OCH_3$ | $CH_3$ | 0 | 0 |
| 32 | Cl | Cl | $CH_2OCH_3$ | $CH_3$ | 0 | 0 |
| 33 | Br | Br | $CH_2OCH_3$ | $CH_3$ | 0 | 0 |
| 34 | F | F | $CH_2OCH_3$ | $CH_3$ | 0 | 1 |
| 35 | F | F | $CH_2OCH_3$ | $C_2H_5$ | 0 | 1 |
| 36 | F | F | $CH_2OC_2H_5$ | $CH_3$ | 0 | 1 |
| 37 | F | Cl | $CH_2OCH_3$ | $CH_3$ | 0 | 1 |
| 38 | Cl | Cl | $CH_2OCH_3$ | $CH_3$ | 0 | 1 |
| 39 | Br | Br | $CH_2OCH_3$ | $CH_3$ | 0 | 1 |
| 40 | F | F | $CH_2OCH_3$ | $CH_2OCH_3$ | 0 | 0 |
| 41 | F | F | $CH_2OC_2H_5$ | $CH_2OC_2H_5$ | 0 | 0 |
| 42 | F | Cl | $CH_2OCH_3$ | $CH_2OCH_3$ | 0 | 0 |
| 43 | Cl | Cl | $CH_2OCH_3$ | $CH_2OCH_3$ | 0 | 0 |
| 44 | Br | Br | $CH_2OCH_3$ | $CH_2OCH_3$ | 0 | 0 |
| 45 | F | F | $CH_2OCH_2CF_3$ | $CH_2OCH_3$ | 0 | 0 |
| 46 | F | F | $CH_2OCH_2CF_3$ | $CH_2OCH_2CF_3$ | 0 | 0 |
| 47 | F | Cl | $CH_2OCH_2CF_3$ | $CH_2OCH_2CF_3$ | 0 | 0 |
| 48 | Cl | Cl | $CH_2OCH_2CF_3$ | $CH_2OCH_2CF_3$ | 0 | 0 |
| 49 | F | F | $CH_2F$ | $CH_3$ | 0 | 0 |
| 50 | F | F | $CH_2F$ | $CH_3$ | 0 | 1 |
| 51 | F | F | $CH_2Cl$ | $C_2H_5$ | 0 | 1 |
| 52 | F | F | $CCl_2H$ | $CH_3$ | 0 | 1 |
| 53 | F | F | $CCl_3$ | $CH_3$ | 0 | 1 |
| 54 | F | F | $CF_3$ | $CH_3$ | 0 | 1 |
| 55 | F | F | $CF_3$ | $C_2H_5$ | 0 | 1 |
| 56 | F | F | $CF_3CH_2$ | $CH_3$ | 0 | 1 |
| 57 | F | F | $C_2F_5$ | $CH_3$ | 0 | 1 |
| 58 | F | F | $CH_2Cl$ | $CH_2Cl$ | 0 | 0 |
| 59 | F | F | $CH_2Br$ | $CH_2Br$ | 0 | 0 |
| 60 | F | Cl | $CH_2Cl$ | $CH_2Cl$ | 0 | 0 |
| 61 | Cl | Cl | $CH_2Cl$ | $CH_2Cl$ | 0 | 0 |

TABLE 3

| Compound No. | $X^1$ | $X^2$ | $R^1$ | $R^2$ | n | m |
|---|---|---|---|---|---|---|
| 62 | F | F | $CH_2C_6H_5$ | $CH_3$ | 0 | 0 |
| 63 | F | F | $CH_2C_6H_5$ | $CH_2C_6H_5$ | 0 | 0 |
| 64 | F | F | $CH_2C_6H_5$ | $CH_2C_6H_5$ | 1 | 1 |
| 65 | F | F | $CH_2CH_2C_6H_5$ | $CH_2CH_2C_6H_5$ | 1 | 1 |
| 66 | F | F | $CH_2C_6H_4F$ | $CH_2C_6H_5$ | 0 | 0 |
| 67 | F | F | $CH_2C_6H_4F$ | $CH_2C_6H_4F$ | 0 | 0 |
| 68 | F | F | $CH_2C_6H_4F$ | $CH_2C_6H_4F$ | 1 | 1 |
| 69 | F | F | $CH_2C_6H_4Cl$ | $CH_2C_6H_4Cl$ | 1 | 1 |
| 70 | F | F | $CH_2C_6H_4CH_4$ | $CH_2C_6H_4CH_4$ | 1 | 1 |
| 71 | F | F | $CH_2C_6H_3(CH_3)_2$ | $CH_2C_6H_3(CH_3)_2$ | 1 | 1 |
| 72 | Cl | F | $CH_2C_6H_5$ | $CH_2C_6H_5$ | 1 | 1 |
| 73 | Cl | Cl | $CH_2C_6H_5$ | $CH_2C_6H_5$ | 1 | 1 |
| 74 | F | F | $C_6H_5$ | $CH_3$ | 0 | 0 |
| 75 | F | F | $C_6H_5$ | $CH_3$ | 0 | 1 |
| 76 | F | F | $C_6H_5$ | $CH_3$ | 1 | 0 |
| 77 | F | F | $C_6H_5$ | $C_2H_5$ | 0 | 1 |
| 78 | F | F | $C_6H_5$ | $C_6H_5$ | 0 | 0 |
| 79 | F | F | $C_6H_5$ | $C_6H_5$ | 0 | 1 |
| 80 | F | F | $C_6H_5$ | $C_6H_5$ | 1 | 1 |
| 81 | F | F | $C_6H_4F$ | $C_6H_5$ | 0 | 0 |
| 82 | F | F | $C_6H_4F$ | $C_6H_4F$ | 0 | 0 |
| 83 | F | F | $C_6H_4Cl$ | $C_6H_4Cl$ | 0 | 0 |
| 84 | F | F | $C_6H_4CH_3$ | $C_6H_4CH_3$ | 0 | 0 |
| 85 | F | F | $C_6H_4CH_3$ | $C_6H_4CH_3$ | 1 | 1 |
| 86 | F | F | $C_6H_4(CH_3)_2$ | $C_6H_4(CH_3)_2$ | 1 | 1 |
| 87 | F | Cl | $C_6H_5$ | $C_6H_5$ | 0 | 0 |
| 88 | Cl | Cl | $C_6H_5$ | $C_6H_5$ | 0 | 0 |

TABLE 4

| Compound No. | $X^1$ | $X^2$ | $R^3$ | n | m |
|---|---|---|---|---|---|
| 89 | F | F | $CH_2$ | 1 | 0 |
| 90 | F | F | $CH_2$ | 1 | 1 |
| 91 | F | F | $CH(CH_3)$ | 1 | 0 |
| 92 | F | F | $CH(CH_3)$ | 1 | 1 |
| 93 | F | F | $C(CH_3)_2$ | 1 | 0 |
| 94 | F | F | $C(CH_3)_2$ | 1 | 1 |
| 95 | F | F | $CH_2CH_2$ | 0 | 0 |
| 96 | F | F | $CH(CH_3)CH_2$ | 0 | 0 |
| 97 | F | F | $C(CH_3)CH_2$ | 0 | 0 |
| 98 | F | F | $CH(CH_3)CH(CH_3)$ | 0 | 0 |
| 99 | F | F | $CH_2CH_2$ | 1 | 0 |
| 100 | F | F | $CH_2CH_2$ | 1 | 1 |
| 101 | F | F | $CH_2OCH_2$ | 0 | 0 |
| 102 | F | F | $CH_2CH_2CH_2$ | 0 | 0 |
| 103 | F | F | $CH_2CH_2CH_2$ | 1 | 0 |
| 104 | F | F | $CH_2CH_2CH_2$ | 1 | 1 |
| 105 | F | F | $CH_2C(CH_3)_2CH_2$ | 0 | 0 |
| 106 | F | F | $CH_2C(CH_3)_2CH_2$ | 1 | 1 |
| 107 | F | F | $CH_2CH_2CH_2CH_2$ | 0 | 0 |
| 108 | F | F | $CH_2CH_2CH_2CH_2$ | 1 | 0 |
| 109 | F | F | $CH_2CH_2CH_2CH_2$ | 1 | 1 |
| 110 | F | F | $CH_2CH_2OCH_2CH_2$ | 0 | 0 |
| 111 | F | F | CHF | 1 | 0 |
| 112 | F | F | $CF_2$ | 1 | 0 |
| 113 | F | F | $CH(CF_3)$ | 1 | 0 |
| 114 | F | F | $CHFCH_2$ | 0 | 0 |
| 115 | F | F | $CH(CF_3)CH_2$ | 0 | 0 |
| 116 | F | Cl | $CH_2$ | 1 | 0 |
| 117 | Cl | Cl | $CH_2$ | 1 | 0 |
| 118 | Cl | Cl | $CH_2CH_2$ | 0 | 0 |
| 119 | Br | Br | $CH_2CH_2$ | 0 | 0 |
| 120 | I | I | $CH_2CH_2$ | 0 | 0 |

In the present invention, as the dihalodicarbonyl compound represented by the formula (I) or (I'), there can be used known ones (the known dihalodicarbonyl compound and process for preparation thereof, refer to, for example, J. Am. Chem. Soc., Vol. 112, p. 8563 (1990); J. Chem. Soc., Chem. Commun., p. 21 (1995); J. Chem. Soc., Perkin Trans., 1, p. 2271 (1996); J. Org. Chem., Vol. 46, p. 3917 (1981); J. Fluorine Chem., Vol. 58, p. 71 (1992); J. Chem. Soc., p. 343 (1994); CA 105–190451 (Zh. Prikl. Khim. (Leningrad), Vol. 58 (No. 11), p. 2504, CA 124–201647 (Patent DE 440263 A1); and Chem. Commun., p. 11 (1970).). Also as shown, for example, in the reaction scheme (2):

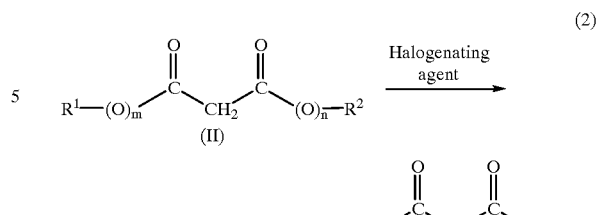

wherein $X^1$ and $X^2$ are the same or different halogen atoms, each of $R^1$ and $R^2$ is independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1, or the scheme (2'):

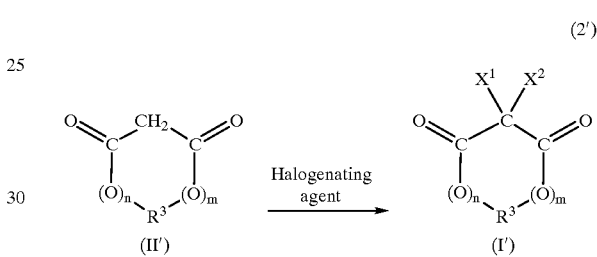

wherein $X^1$ and $X^2$ are the same or different halogen atoms, $R^3$ is an alkylene chain or haloalkylene chain having 1 to 6 carbon atoms which may contain or may not contain oxygen atom in its chain, each of m and n is independently 0 or 1, there may be used a dihalodicarbonyl compound obtained by halogenating the dicarbonyl compound represented by the formula (II) or (II') through known process.

As the halogenating agent used for the halogenation reaction, there can be used one usually known as halogenating agent. From the viewpoint of commercial availability, there are fluorine, chlorine, bromine, iodine, N-fluoropyridinium salt, N-fluoro-2,4,6-trimethylpyridinium salt, N-fluoro-3,5-dichloropyridinium salt, N-fluoro-2,6-dichloropyridinium salt, N-fluoropentachloropyridinium salt, N,N'-difluoro-bipyridinium salt, N-fluoropyridinium-2-sulfonate, N-fluoro-4,6-dimethylpyridinium-2-sulfonate, N-fluoro-4-methylpyridinium-2- sulfonate, N-fluoro-5-(trifluoromethyl)pyridinium-2-sulfonate, N-fluoro-6-(trifluoromethyl)pyridinium-2-sulfonate, N-fluoro-4,6-bis(trifluoromethyl)pyridinium-2- sulfonate, -chloromethyl-N'-fluoro-1,4-diazoniabicyclo[2,2,2]octane salt, N-fluoro-N'-hydroxy-1,4-diazoniabicyclo[2,2,2]octane salt, N,N'-difluoro-1,4-diazoniabicyclo[2,2,2]octane salt, N-fluorobis(benzenesulfonyl)amide, N-fluorobis(methanesulfonyl)amide, N-fluorobis(trifluoromethanesulfonyl)amide, N-fluoro-o-benzenedisulfonimide, thionyl chloride, sulfuryl chloride, N-chlorosuccinimide, N-bromosuccinimide, N-iodosuccinimide, trichloroisocyanuric acid, sodium dichloroisocyanurate, 1,3-dichloro-5,5-dimethylhydantoin, 1,3-dibromo-5,5-dimethylhydantoin, periodic acid, orthoperiodic acid, and the like.

Known reaction conditions may be used for the halogenation reaction. For example, as shown in the reaction scheme (2) or (2'), the dicarbonyl compound (II) or (II') may be halogenated by reacting with the halogenating agent at a reaction temperature ranging from about −80° C. to +150° C. by using a solvent such as methylene chloride, chloroform, carbon tetrachloride, dichloroethane, acetonitrile, acetic acid or formic acid or without using a solvent. Such a halogenation reaction may be carried out, as occasion demands, in the presence of an acid or a base or under light irradiation.

In the halogenation reaction, when $X^1$ and $X^2$ of the dicarbonyl compound of the formula (II) or (II') are the same halogen atoms, the dihalodicarbonyl compound of the present invention represented by the formula (I) or (I') can be prepared in a high yield usually by using the halogenating agent in an amount of two equivalents or more. When $X^1$ and $X^2$ are different halogen atoms, the dihalodicarbonyl compound of the present invention can be prepared in a high yield by using one equivalent each of the different two halogenating agents and reacting step by step.

Further by carrying out distillation, sublimation, etc. after usual post-treatment, the dihalodicarbonyl compound having a higher purity can be obtained.

Also the dihalodicarbonyl compound of the present invention represented by the formula (I) or (I') can be modified to other dihalodicarbonyl compound shown by the formula (I) or (I') through a known organic chemical reaction such as halogenation reaction (cf. Reference Example 6).

The electrolyte of the present invention comprises the dihalodicarbonyl compound solely or a mixture of two or more thereof, or as occasion demands, may be a mixture of solvent and solute which is obtained by mixing the dihalodicarbonyl compound with other solvent than that.

When the dihalodicarbonyl compound is used as a solvent for an electrolyte of the electric energy generator, the dihalodicarbonyl compound may be used solely or in a mixture of two or more thereof, or in a mixture of one or more of the dihalodicarbonyl compounds with one or more of other solvents.

In the case where the dihalodicarbonyl compound is in the form of solid at an operable temperature of the electric energy generator, in order to generate electric energy with minimizing energy loss, it is preferable to mix the dihalodicarbonyl compound with other dihalodicarbonyl compound and/or other solvent and use in the form of liquid.

When two or more of the dihalodicarbonyl compounds are used, a preferred mixing ratio thereof may be selected optionally depending on applications of the obtained electrolyte and conditions for use.

Examples of the other solvent which can be used suitably for the electrolyte of the present invention are, for instance, non-aqueous solvents such as dimethyl carbonate, diethyl carbonate, ethylene carbonate, propylene carbonate, butylene carbonate, sulfolane, methyl sulfolane, γ-butyrolactone, γ-valerolactone, dimethyl sulfoxide, N,N'-dimethylformamide, N-methyloxazolidinone, 1,3-dioxolane, 2-methyltetrahydrofuran, diethyl ether, tetrahydrofuran, dimethoxymethane, dimethoxyethane, diethoxyethane, diglyme, triglyme, tetraglyme, acetonitrile, propionitrile, methyl formate, ethyl formate, methyl acetate, ethyl acetate, methyl propionate and dimethyl sulfite. Among them, from the viewpoint of high polarity and high resistance to oxidation, use of dimethyl carbonate, diethyl carbonate, ethylene carbonate, propylene carbonate, sulfolane, methyl sulfolane, γ-butyrolactone, γ-valerolactone, 1,3-dioxolane, dimethoxyethane, diethoxyethane, acetonitrile, methyl formate or ethyl formate is particularly preferred.

A preferred mixing ratio of the dihalodicarbonyl compound to the other solvent may be selected optionally depending on applications of the obtained electrolyte and conditions for use.

For example, as mentioned below, in a battery employing a N-fluoropyridinium salt as an active material for positive electrode, for the purpose to prevent battery deteriorations such as lowering of discharge voltage and discharge capacity at high temperature, the electrolyte of the present invention preferably contains the dihalodicarbonyl compound in an amount of not less than 30% by volume, further from 40 to 100% by volume in order to exhibit sufficient effects of the present invention.

For the purposes of giving flame retardance, improving charge and discharge cycle and preventing dendrite of metal lithium, an amount of the dihalodicarbonyl compound in the electrolyte of the present invention may be not more than 50% by volume, further from 0.01 to 40% by volume.

With respect to the solutes which can be used for the electrolyte of the present invention, conventional ones may be employed. From the viewpoint of applicability to high performance batteries such as a lithium battery and lithium ion battery and from the viewpoint of large effect of the present invention, preferable are lithium salts such as $LiClO_4$, $LiBF_4$, $LiPF_6$, $LiAsF_6$, $LiSbF_6$, $LiOSO_2CF_3$, $LiOSO_2C_2F_5$, $LiOSO_2C_4F_9$, $LiAlCl_4$, $LiN(SO_2CF_3)_2$, $LiN(SO_2C_2F_5)_2$, $LiC(SO_2CF_3)_3$, and $LiB[C_6H_3(CF_3)_2]_4$.

The concentration of the solute in the electrolyte of the present invention is preferably from 0.5 to 1.5 mol/liter. This is because when the concentration is less than 0.5 mol/liter, there is a case where enough electric conductivity cannot be obtained, and when more than 1.5 mol/liter, there is a case where a lithium salt is precipitated.

As mentioned below, when a N-fluoropyridinium salt soluble in the electrolyte of the present invention is used as an active material for positive electrode of the electric energy generator, since the N-fluoropyridinium salt can also has a role of the solute, there is a case where the above-mentioned solute may not be used (cf. Examples 12 and 13).

The electrolyte of the present invention can be used for various electric energy generators. Accordingly the present invention relates to the electric energy generator employing the above-mentioned electrolyte.

The electric energy generator of the present invention comprises at least three components of an active material for positive electrode, the mentioned electrolyte and an active material for negative electrode. With respect to other components, there is no particular limitation, and conventional ones can be applied.

Examples of the preferred active material for positive electrode which can be used for the electric energy generator of the present invention are known ones, for instance, metal oxide such as lithium-containing metal oxide, metal chalcogenide, metal halogenide, carbonaceous material, organic polymer and compound having N-F bond.

Examples of the metal oxide are lithium-containing metal oxides such as $LiCoO_2$, $LiNiO_2$, $LixNiyCo_{1-y}O_2$ ($0<x<1$, $0.7<y<1.02$), $LiMnO_2$, $LiMn_2O_4$, $LiFeO_2$ and $Li_xV_2O_5$ ($0<x<3$). In addition there are $MnO_2$, $V_2O_5$, $V_2O_4$, $V_2O_3$, $CoO_2$, $Co_2O_3$, $NiO_2$, $Ni_2O_3$, $AgO$, $Ag_2O$, $Ag_2CrO_4$, $CuO$, $PbO$, $SnB_xP_yO_z$ (for example, x=0.4 to 0.6, y=0.6 to 0.4, z=(2+3x+5y)/2), $SnO$, $SnO_2$, $TiO_2$, $Sb_2O_3$, $Bi_2O_3$, $Bi_2Pb_2O_5$, $Nb_2O_3$, $SeO_2$, $TeO_2$, $Cr_2O_3$, $MoO_3$, $WO_3$, $Fe_2O_3$, $FeO_2$, and the like.

Examples of the metal chalcogenide are $CuS$, $FeS_2$, $TiS_2$, $MOS_2$, $VSe_2$, $CuCo_2S_4$, $NbSe_2$, and the like. Examples of the metal halogenide are $FeF_3$, $AgCl$, $CuCl_2$, $PbI_2$, $HgF$, $CuF$, $CdF_2$, $BiF_3$, and the like.

Examples of the carbonaceous material are materials being capable of doping and undoping of anions, for instance, pyrolytic carbons; cokes such as pitch coke, needle coke and petroleum coke; graphites; glassy carbons; carbonized materials of organic high molecular compounds obtained by sintering a phenol resin, furan resin, and the like at a proper temperature; carbon fibers; activated carbons, and the like.

Examples of the organic polymer are polyaniline, polyacetylene, polyphenylene, polypyrrole, polythiophene, polyfuran, polydisulfide, and the like.

Examples of the preferred compound having N-F bond are a substituted- or non-substituted-N-fluoropyridinium salt, N,N'-difluorobipyridinium salt, poly(N-fluoropyridinium salt), and the like.

Among the active materials for positive electrode which can be used for the electric energy generator of the present invention, from the point that high voltage and high electric energy can be generated, particularly preferable are the compounds having N—F bond, the materials such as the metal oxide, metal chalcogenide, metal halogenide and carbonaceous material which are capable of doping and undoping lithium ion.

Examples of the preferred active material for negative electrode which can be used for the electric energy generator of the present invention are known ones, for instance, a metal, metal alloy, metal oxide, carbonaceous material and organic polymer.

Examples of the above-mentioned metal are Li, Na, K, Cs, Mg, Ca, Al, Zn, Cu, Sn, and the like. Examples of the metal alloy are, for instance, Li—Al, Li—Sn, Li—Pb, Li—Zn, Li—Cd, Li—Mg, Li-Wood's metal alloys, and the like.

Examples of the metal oxide are $CoVO_4$, $LiCoVO_4$, $Nb_2O_5$, $Li_xNb_2O_5(x<3)$, $SnB_xP_yO_z$ (for example, x=0.4 to 0.6, y=0.6 to 0.4, z=(2+3x+5y)/2), SnO, $SnO_2$, PbO, $PbO_2$, GeO, $GeO_2$, $SiO_2$, $TiO_2$, $LiTiO_2$, and the like.

Examples of the carbonaceous material are materials being capable of doping and undoping, for example, a metal such as Li or cation such as $Li^+$, for instance, pyrolytic carbons; cokes such as pitch coke, needle coke and petroleum coke; graphites; glassy carbons; carbonized materials of organic high molecular compounds obtained by sintering a phenol resin, furan resin, or the like at a proper temperature; carbon fibers; activated carbons, and the like.

As the organic polymer for an active material for negative electrode, there can be used those exemplified as the polymer which can be used as an active material for positive electrode.

Among the above-mentioned active materials for negative electrode which can be used for the electric energy generator of the present invention, from the point that high voltage and high electric energy can be generated, particularly preferable are the alkali metal or alkaline earth metal such as Li, Na, K, Cs or Ca; the metal alloys containing alkali metal such as Li—Al alloy; the metal oxide or carbonaceous material which is capable of doping and undoping of metal such as Li or cation such as lithium ion; and the like.

The present invention is then explained below by means of Examples, but the present invention is not limited to them.

REFERENCE EXAMPLE 1

A dihalodicarbonyl compound used for the electrolyte of the present invention was prepared in the manner mentioned below according to the reaction scheme (3):

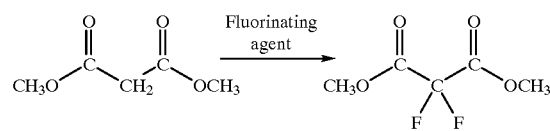

(3)

A reaction tube made of glass was charged with 13.2 g (0.10 mol) of dimethyl malonate, 84.1 g (0.29 mol) of N-fluoro-2,4,6-trimethylpyridinium trifluoromethanesulfonate, 5.3 g (0.04 mol) of aluminum chloride and 10 ml of methylene chloride, followed by filling with nitrogen gas. After sealing the tube, the sealed tube was dipped in a bath of 90° C. and heated for 61.5 hours. After the tube was allowed to stand for cooling and then opened, methylene chloride was distilled off from the obtained reaction mixture under normal pressure. Then the bath temperature was raised to 150° C. under reduced pressure, and all the distillates were collected. Those distillates were re-distilled under normal pressure to obtain a distillate of 165° to 167° C., which was dimethyl 2,2-difluoromalonate (yield 12.3 g (73%)). Physical properties and spectrum data thereof are shown below.

Melting point: −27° C.

Boiling point: 165° to 167° C.

$^1$H-NMR (in $CD_3CN$): δ 3.90 (s,OCH3)

$^{19}$H-NMR (in $CD_3CN$, internal standard of $CFCl_3$) : −111.8 ppm (s,$CF_2$)

Mass spectrum: Measured 168.02357 ($M^+$) Calculated 168.02342 ($C_5H_6O_4F_2$)

REFERENCE EXAMPLE 2

A dihalodicarbonyl compound used for the electrolyte of the present invention was prepared in the manner mentioned below according to the reaction scheme (4):

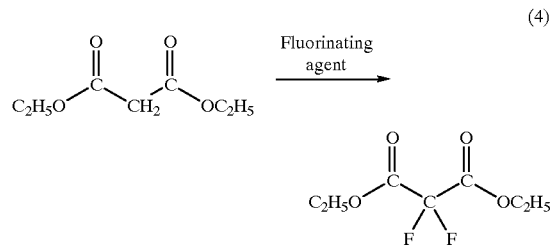

(4)

A reaction vessel was charged with 32.1 g (0.20 mol) of diethyl malonate, 127.4 g (0.44 mol) of N-fluoro-2,4,6-trimethylpyridinium trifluoromethanesulfonate, 10.7 g (0.08 mol) of aluminum chloride and 40 ml of 1,2-dichloroethane, followed by heating and refluxing for 19 hours. After the reaction and distillation under reduced pressure, diethyl 2,2-difluoromalonate was obtained in yield of 31.1 g (79%). Physical properties and spectrum data thereof are shown below.

Melting point: not more than −80° C.

Boiling point: 51° to 53° C./26 mmHg $^1$H-NMR (in $CD_3CN$):

δ 4.37 (q, J=7.1 Hz, 4H, 2×$CH_2$)

1.31 (t, J=7.1 Hz, 6H, 2×$CH_3$)

$^{19}$F-NMR (in $CD_3CN$, internal standard of $CFCl_3$): −112.1 ppm (s,$CF_2$)

Mass spectrum: Measured 197.06269 ((M+H)$^+$) Calculated 197.06254 ($C_7H_{11}F_2O_4$)

REFERENCE EXAMPLE 3

A dihalodicarbonyl compound used for the electrolyte of the present invention was prepared in the manner mentioned below according to the reaction scheme (5):

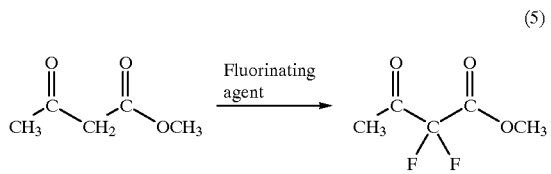

(5)

A reaction tube made of glass was charged with 11.6 g. (0.10 mol) of methyl acetoacetate, 72.3 g (0.25 mol) of N-fluoro-2,4,6-trimethylpyridinium trifluoromethanesulfonate, 5.46 g (0.04 mol) of zinc chloride and 15 ml of methylene chloride, followed by filling with nitrogen gas. After sealing the tube, the sealed tube was heated in a bath of 60° C. for 64 hours and then heated in a bath of 70° C. for 24 hours. After the tube was allowed to stand for cooling and then opened, methylene chloride which was a solvent was distilled off from the obtained reaction mixture under normal pressure. Then the bath temperature was raised to 120° C. under reduced pressure, and all the obtained distillates were collected. Those distillates were re-distilled under normal pressure to obtain a distillate at 147° to 149° C., which was methyl 2,2-difluoroacetoacetate (yield 12.2 g (80%)). Physical properties and spectrum data thereof are shown below.

Melting point: −43° C.

Boiling point: 147° to 149° C.

$^1$H-NMR (in $CD_3CN$):

δ 3.89 (s,3H,$OCH_3$)

2.39 (t,J=1.7 Hz,3H,$CH_3$)

$^{19}$F-NMR (in $CD_3CN$, internal standard of $CFCl_3$): −113.6 ppm (s,$CF_2$)

Mass spectrum: Measured 152.02855 (M$^+$) Calculated 152.02850 ($C_5H_6O_3F_2$)

REFERENCE EXAMPLE 4

A dihalodicarbonyl compound used for the electrolyte of the present invention was prepared in the manner mentioned below according to the reaction scheme (6):

(6)

A reaction tube made of glass was charged with 20.0 g (0.20 mol) of 2,4-pentanedione, 146 g (0.50 mol) of N-fluoro-2,4,6-trimethylpyridinium trifluoromethanesulfonate, 10.9 g (0.08 mol) of zinc chloride and 45 ml of methylene chloride, followed by filling with nitrogen gas. After sealing the tube, the sealed tube was heated in a bath of 60° C. for 65.5 hours. After the tube was allowed to stand for cooling and then opened, methylene chloride which was a solvent was distilled off under normal pressure. Then the bath temperature was raised to 130° C. under reduced pressure, and all the obtained distillates were collected. Those distillates were re-distilled under normal pressure to obtain a distillate at 116° to 118° C., which was 3,3-difluoro-2,4-pentanedione (yield 16.1 g (59%)). Physical properties and spectrum data thereof are shown below.

Melting point: −49° C.

Boiling point: 116° to 118° C.

$^1$H-NMR (in $CD_3CN$):

δ 2.35 (t,J=1.7 Hz,$CH_3$)

$^{19}$F-NMR (in $CD_3CN$, internal standard of $CFCl_3$): −114.9 ppm (s,$CF_2$)

Mass spectrum: Measured 136.03331 (M$^+$) Calculated 136.03359 ($C_5H_6F_2O_2$)

REFERENCE EXAMPLE 5

A dihalodicarbonyl compound used for the electrolyte of the present invention was prepared in the manner mentioned below according to the reaction scheme (7):

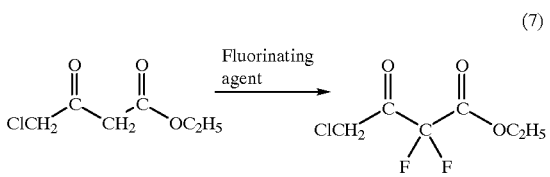

(7)

A reaction tube made of glass was charged with 32.9 g (0.20 mol) of ethyl 4-chloroacetoacetate, 144.9 g (0.501 mol) of N-fluoro-2,4,6-trimethylpyridinium trifluoromethanesulfonate, 10.9 g (0.082 mol) of aluminum chloride and 80 ml of methylene chloride, followed by filling with nitrogen gas. After sealing the tube, the tube was heated in a bath of 85° C. for 31.5 hours. After the tube was allowed to stand for cooling and then opened, methylene chloride which was a solvent was distilled off under normal pressure. Then the bath temperature was raised to 140° C. under reduced pressure, and all the obtained distillates were collected. Those distillates were re-distilled under normal pressure to obtain a distillate at 94° to 95° C./33 mmHg, which was ethyl 4-chloro-2,2-difluoroacetoacetate (yield 30.5 g (76%)). Physical properties and spectrum data thereof are shown below.

Melting point: not more than −80° C.

Boiling point: 94° to 95° C./33 mmHg $^1$H-NMR (in $CD_3CN$):

δ 4.73 (t,J=0.7 Hz,2H,$ClCH_2$)

4.37 (q,J=7.1 Hz,2H,$OCH_2$)

1.31 (t,J=7.1 Hz,3H,$CH_3$)

$^{19}$F-NMR (in $CD_3CN$, internal standard of $CFCl_3$): −112.8 (s,$CF_2$)

Mass spectrum: Measured 200.00557 (M$^+$) Calculated 200.00518 ($C_6H_7ClF_2O_3$)

REFERENCE EXAMPLE 6

A dihalodicarbonyl compound was prepared according to the reaction scheme (8):

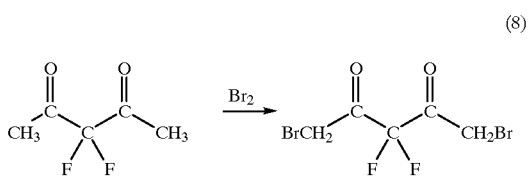

(8)

To a mixture comprising 9.5 g (0.07 mol) of 3,3-difluoro-2,4-pentanedione, 14 ml of ether and 14 ml of carbon tetrachloride was added 7.4 ml (0.144 mol) of bromine at 0° C., followed by stirring for 24 hours. Then the stirring was carried out at room temperature for two hours. The reaction mixture was poured into water, followed by extraction with ether. The solution extracted with ether was washed with water and dried with magnesium sulfate. After the magnesium sulfate was removed through filtration, the solvent was distilled off. The residue was subjected to fractional distillation under reduced pressure to obtain 11.4 g of distillate at 840 to 87° C/23 mmHg (yield 55%). Physical properties and spectrum data of 1,5-dibromo-3,3-difluoropentanedione are shown below.

Melting point: 330 to 35° C.
Boiling point: 84° to 87° C/23 mmHg
$^1$H-NMR (in $CD_3CN$):
δ 4.51 (t,J=1.0 Hz,$CH_2$)
$^{19}$F-NMR (in $CD_3CN$, internal standard of $CFCl_3$): −110.9 ppm (s,$CF_2$)

REFERENCE EXAMPLE 7

A dihalodicarbonyl compound used for the electrolyte of the present invention was prepared in the manner mentioned below according to the reaction scheme (9):

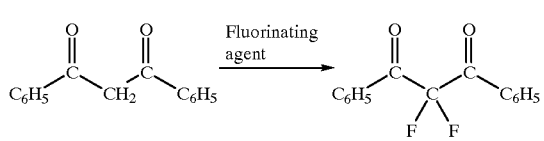

(9)

A mixture comprising 224 mg (1 mmol) of 1,3-diphenyl-1,3-propanedione, 54 mg (0.4 mmol) of dried zinc chloride, 578 mg (2 mmol) of N-fluoro-2,4,6-trimethyl-pyridinium trifluoromethanesulfonate and 2 ml of dichloroethane was stirred at 60° C. for 18 hours. The reaction solution was extracted with ether. The solvent was distilled off from the extracted solution. The obtained residue was passed through a column chromatograph filled with silica gel to give 229 mg (88%) of 2,2-difluoro-1,3-diphenyl-1,3-propanedione. Physical properties and spectrum data thereof are shown below.

Melting point: 60° to 61° C.
$^1$H-NMR (in $CDCl_3$):
δ 7.32–7.77 (6H,m,aromatic protons)
7.95–8.23 (4H,m,aromatic protons)
$^{19}$F-NMR (in $CDCl_3$, internal standard of $CFCl_3$) : −102.8 ppm (s,$CF_2$)
Mass spectrum: 260 (M$^+$)

Elementary analysis: Measured $C_{69.28}$%; H 3.97% Calculated ($Cl_5H_{10}F_2O_2$) $C_{69.23}$%; H 3.87%

REFERENCE EXAMPLE 8

A dihalodicarbonyl compound used for the electrolyte of the present invention was prepared in the manner mentioned below according to the reaction scheme (10):

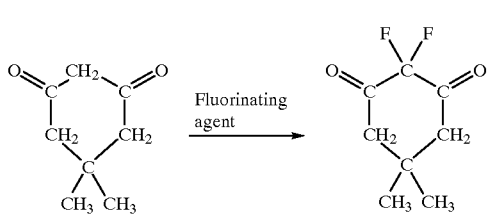

(10)

To 20 ml of formic acid was dissolved 2.81 g (20 mmol) of 5,5-dimethyl-1,3-cyclohexanedione. Thereto was blown a mixed gas of 20% $F_2$/80% $N_2$ at a rate of 50 ml/min with stirring under cooling in ice bath. The reaction was terminated at the time when 44 mmol of $F_2$ had been flowed. After the reaction, $N_2$ gas was flowed to remove unreacted $F_2$ gas, and then a solvent in the reaction mixture was distilled off. An obtained residue was distilled under reduced pressure to give 2,2-difluoro-5,5-dimethyl-1,3-cyclohexanedione in a yield of 2.17 g (61%). Physical properties and spectrum data thereof are shown below.

Boiling point: 83° to 85° C./75 mmHg
$^1$H-NMR (in $CD_3CN$):
δ 2.86 (4H,t,J=2 Hz,$CH_2$)
1.05 (6H,s,$CH_3$)
$^{19}$F-NMR (in $CD_3CN$, internal standard of $CFCl_3$): −121.5 ppm (s,$CF_2$)
Mass spectrum: Measured 176.06485 (M$^+$) Calculated 176.06489 ($C_6H_6F_2O_2$)

EXAMPLE 1

N-Fluoropyridinium tetrafluoroborate (75% by weight), acetylene black powder (15% by weight) and propylene carbonate (5% by weight) were weighed and put in a mortar, and then finely ground. To the mixture was added a polytetrafluoroethylene binder (F-104 available from Daikin Industries, Ltd.: 5% by weight), followed by kneading sufficiently. Then after rolling with a press machine, the rolled product was punched into circular pellets of 16.5 mm diameter to give an active material for positive electrode of 217 mg.

To the gold-plated inner surfaces of positive and negative electrodes of 2016 button type battery was welded a gold-plated nickel wire mesh (diameter: 16 mm and 12 mm, respectively), and an insulating packing was fixed to the side of the negative electrode. Then a metal lithium (diameter: 16 mm, thickness: 0.38 mm), separator (Celgard #2400, diameter: 20 mm) and active material for positive electrode (diameter: 16.5 mm) were layered in that order from the negative electrode side, followed by adding therebetween an electrolyte (1 mol/liter of $LiPF_6$/$CH_3OCOCF_2COOCH_3$) in the total amount of 0.15 ml. Then a button type battery was assembled in usual manner.

A diagrammatic partial cross-sectional view of the obtained button type battery is shown in FIG. 1. In FIG. 1, numeral 1 represents a negative electrode container (made of gold-plated steel), numeral 2 represents lithium (active material for negative electrode), numeral 3 represents a gold-plated nickel wire mesh, numeral 4 represents an insulating packing, numeral 5 represents an active material for positive electrode, numeral 6 represents a positive electrode container (made of gold-plated steel) and numeral 7 represents a separator.

[Measurement of DC internal resistance of battery]

Figure 2:
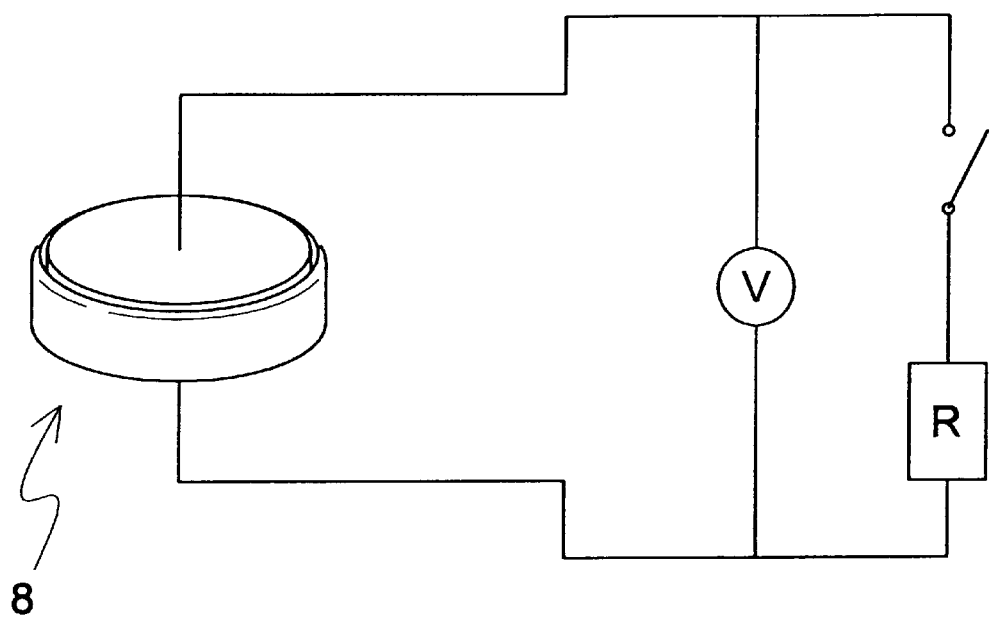
FIG. 2 is a diagrammatic view of a device for measuring a DC internal resistance of the battery used in Example of the present invention.

A cell voltage of the device shown in FIG. 2 was measured after one minute by loading an external resistor of 1MΩ, 510KΩ, 100KΩ or 51KΩ. A DC internal resistance was calculated from the measured voltage and current at each resistance through the method of least squares. In FIG. 2, numeral 8 represents the button type battery, V represents a voltmeter and R represents an external resistor. The results are shown in Table 5.

EXAMPLES 2 to 16

A button type battery having the components shown in Tables 5 to 7 was assembled in the same manner as in Example 1. An open circuit voltage of the battery and a DC internal resistance at 20° C. are shown in Tables 5 to 7. A mixing ratio of the solvents in the electrolyte is a volumetric ratio. In Examples 12 and 13, acetylene black (TAB-2 available from Hohsen Corp.) containing a binder (polytetrafluoroethylene) was used.

COMPARATIVE EXAMPLES 1 to 2

A battery was assembled in the same manner as in Example 7 except that the electrolyte ($CH_3OCOCF_2COOCH_3$) was changed to γ-butyrolactone as shown in Table 8. This is assumed to be Comparative Example 1. Similarly, a battery was assembled in the same manner as in Example 10 except that the electrolyte ($CH_3OCOCF_2COOCH_3$/propylene carbonate =9/1, volumetric ratio) was changed to propylene carbonate/dimethyl carbonate (=1/1, volumetric ratio) as shown in Table 8. This is assumed to be Comparative Example 2. The results of measurement of an open circuit voltage and a DC internal resistance at 20° C. are shown in Table 8.

TABLE 5

| | Active material for positive electrode | | Active material | | Electrolyte | | Open circuit | DC Internal |
|---|---|---|---|---|---|---|---|---|
| Ex. | Composition (% by weight) | Total weight (mg) | for negative electrode | Separator | Solvent (ml) | Solute (mol/liter) | voltage (V) | resistance (kΩ) |
| 1 | N-fluoropyridinium tetrafluoroborate (75), acetylene black (15), propylene carbonate (5), binder (5) | 217 | Lithium | Celgard #2400 | $CH_3OCOCF_2COOCH_3$ (0.15 ml) | $LiPF_6$ (1) | 3.48 | 2.0 |
| 2 | N-fluoropyridinium tetrafluoroborate (75), acetylene black (15), propylene carbonate (5), binder (5) | 212 | Lithium | Celgard #2400 | $CH_3COCF_2COOCH_3$ (0.15 ml) | $LiPF_6$ (1) | 3.46 | 1.64 |
| 3 | N-fluoropyridinium tetrafluoroborate (75) acetylene black (15), propylene carbonate (5), binder (5) | 227 | Lithium | Celgard #2400 | $CH_3COCF_2COCH_3$ (0.15 ml) | $LiPF_6$ (1) | 3.52 | 1.58 |
| 4 | N-fluoropyridinium tetrafluoroborate (75), acetylene black (15), propylene carbonate (5) binder (5) | 234 | Lithium | Celgard #2400 | $CH_3OCOCF_2COOCH_3$/ $ClCH_2COCF_2COOCH_2CH_3$ = 2/1 (0.15 ml) | $LiPF_6$ (1) | 3.51 | 2.16 |
| 5 | N-fluoropyridinium tetrafluoroborate (75), acetylene black (15), propylene carbonate (5), binder (5) | 192 | Lithium | Celgard #2400 | $CH_3COCF_2COOCH_3$/ $ClCH_2COCF_2COOCH_2CH_3$ = 2/1 (0.15 ml) | $LiPF_6$ (1) | 3.56 | 1.22 |

TABLE 6

| | Active material for positive electrode | | Active material | | Electrolyte | | Open circuit | DC Internal |
|---|---|---|---|---|---|---|---|---|
| Ex. | Composition (% by weight) | Total weight (mg) | for negative electrode | Separator | Solvent (ml) | Solute (mol/liter) | voltage (V) | resistance (kΩ) |
| 6 | N-fluoropyridinium tetrafluoroborate (75), acetylene black (15), propylene carbonate (5), binder (5) | 244 | Lithium | Celgard #2400 | $BrCH_2COCF_2COCH_2Br$/ propylene carbonate/ dimethyl carbonate = 1/1/1 (0.15 ml) | $LiPF_6$ (1) | 3.57 | 1.71 |

TABLE 6-continued

| Ex. | Active material for positive electrode Composition (% by weight) | Total weight (mg) | Active material for negative electrode | Separator | Electrolyte Solvent (ml) | Solute (mol/liter) | Open circuit voltage (V) | DC Internal resistance (kΩ) |
|---|---|---|---|---|---|---|---|---|
| 7 | N-fluoropyridinium tetrafluoroborate (73), iodine (2), acetylene black (15), γ-butyrolactone (5), binder (5) | 225 | Lithium | Celgard #2400 | $CH_3OCOCF_2COOCH_3$ (0.15 ml) | $LiBF_4$ (20 mg)* | 3.70 | 1.08 |
| 8 | N-fluoropyridinium tetrafluoroborate (78), iodine (2), acetylene black (15), binder (5) | 176 | Lithium | Celgard #2400 | $CH_3CH_2OCOCF_2COOCH_2CH_3$ (0.13 ml) | $LiPF_6$ (1) | 3.65 | 1.22 |
| 9 | N-fluoropyridinium tetrafluoroborate (78), iodine (2), acetylene black (15), binder (5) | 163 | Lithium | Celgard #2400 | $CH_3OCOCF_2COOCH_3$/ $CH_3CH_2OCOCF_2COOCH_2CH_3$ = 1/1 (0.13 ml) | $LiPF_6$ (1) | 3.59 | 1.58 |
| 10 | N-fluoropyridinium tetrafluoroborate (73), methane tetraiodide (2), acetylene black (15), binder (5), 1 mol/liter of $LiPF_6$ of $CH_3OCOCF_2COOCH_3$/ propylene carbonate (9/1) solution (5) | 188 | Lithium | Celgard #2500 | $CH_3OCOCF_2COOCH_3$/ propylene carbonate = 9/1 (0.1 ml) | $LiPF_6$ (1) | 3.72 | 1.13 |

*20 Mg of pulverized $LiBF_4$ was added between the separator and the active material layer for positive electrode.

TABLE 7

| Ex. | Active material for positive electrode Composition (% by weight) | Total weight (mg) | Active material for negative electrode | Separator | Electrolyte Solvent (ml) | Solute (mol/liter) | Open circuit voltage (V) | DC Internal resistance (kΩ) |
|---|---|---|---|---|---|---|---|---|
| 11 | N-fluoropyridinium tetrafluoroborate (73), methane tetraiodide (2), acetylene black (15), binder (5), 1 mol/liter of $LiPF_6$ of $CH_3OCOCF_2COOCH_3$/ propylene carbonate (9/1) solution (5) | 167 | Lithium | Celgard #2500 | $CH_3OCOCF_2COOCH_3$/ propylene carbonate = 7/3 (0.1 ml) | $LiPF_6$ (1) | 3.77 | 1.14 |
| 12 | N-fluoro-3-methylpyridinium tetrafluoroborate (54.5), acetylene black (32), γ-butyrolactone (4.5), $LiBF_4$ (9) | 177 | Lithium | Celgard #2500 | $CH_3OCOCF_2COOCH_3$ (0.11 ml) | — | 3.50 | 1.22 |
| 13 | N-fluoro-3-methylpyridinium tetrafluoroborate (54.5), acetylene black (32), γ-butyrolactone (4.5), $LiBF_4$ (9) | 176 | Lithium | Celgard #2500 | $CH_3COCF_2COOCH_3$ (0.11 ml) | — | 3.54 | 0.98 |
| 14 | N-fluoropyridinium tetrafluoroborate (73), acetylene black (15), binder (5), iodine (2), propylene carbonate (5) | 217 | Lithium | Celgard #2400 | $CH_3OCOCCl_2COOCH_3$/ propylene carbonate = 1/1 (0.10 ml) | $LiPF_6$ (0.7) | 3.67 | 0.70 |
| 15 | N-fluoropyridinium tetrafluoroborate (73), acetylene black (15), binder (5), iodine (2), propylene carbonate (5) | 204 | Lithium | Celgard #2400 | $CH_3OCOCBr_2COOCH_3$/ propylene carbonate = 1/1 (0.10 ml) | $LiPF_6$ (0.8) | 3.76 | 0.45 |

TABLE 7-continued

| Ex. | Composition (% by weight) | Active material for positive electrode Total weight (mg) | Active material for negative electrode | Separator | Electrolyte Solvent (ml) | Solute (mol/liter) | Open circuit voltage (V) | DC Internal resistance (kΩ) |
|---|---|---|---|---|---|---|---|---|
| 16 | N-fluoropyridinium tetrafluoroborate (73), acetylene black (15), binder (5), iodine (2), propylene carbonate (5) | 119 | Lithium | Celgard #2400 | $CH_2COCF_2COCH_2C(CH_3)_2$/ propylene carbonate = 1/1 (0.10 ml) | $LiPF_6$ (0.8) | 3.82 | 0.87 |

TABLE 8

| Com. Ex. | Composition (% by weight) | Active material for positive electrode Total weight (mg) | Active material for negative electrode | Separator | Electrolyte Solvent (ml) | Solute (mol/liter) | Open circuit voltage (V) | DC Internal resistance (kΩ) |
|---|---|---|---|---|---|---|---|---|
| 1 | N-fluoropyridinium tetrafluoroborate (73), iodine (2), acetylene black (15), γ-butyrolactone (5), binder (5) | 223 | Lithium | Celgard #2400 | γ-Butyrolactone (0.15 ml) | $LiBF_4$ (20 mg)* | 3.71 | 0.42 |
| 2 | N-fluoropyridinium tetrafluoroborate (73), methane tetraiodide (2), acetylene black (15), binder (5), 1 mol/liter of $LiPF_6$ of $CH_3OCOCF_2COOCH_3$/ propylene carbonate (9/1) solution (5) | 141 | Lithium | Celgard #2500 | Propylene carbonate/ dimethyl carbonate = 1/1 (0.1 ml) | $LiPF_4$ (1) | 3.76 | — |

*20 Mg of pulverized $LiBF_4$ was added between the separator and the active material layer for positive electrode.

[Comparison of discharge curve]

Figure 3:
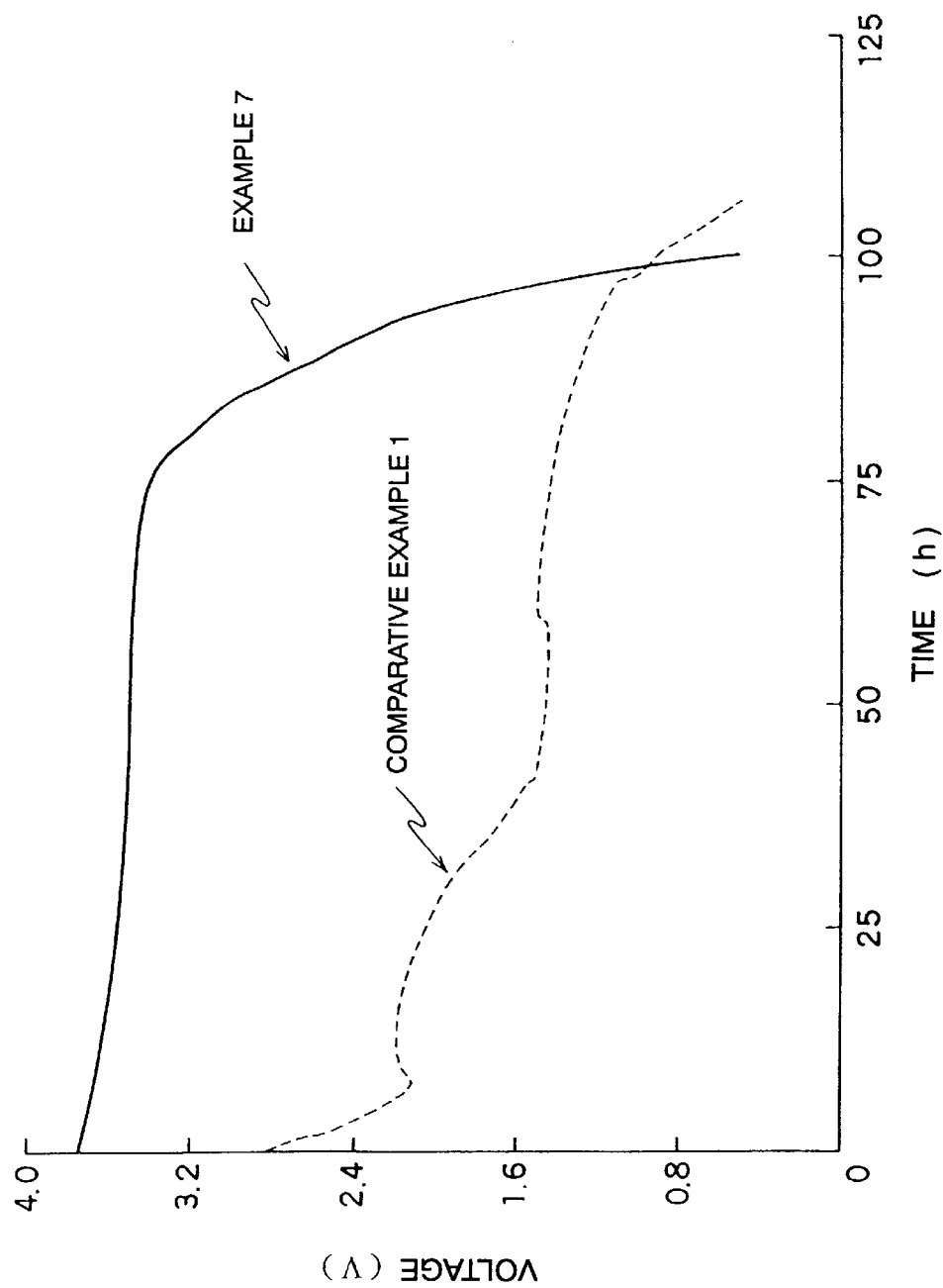
FIG. 3 shows discharge curves of the batteries obtained in Example 7 of the present invention and Comparative Example 1.
Figure 4:
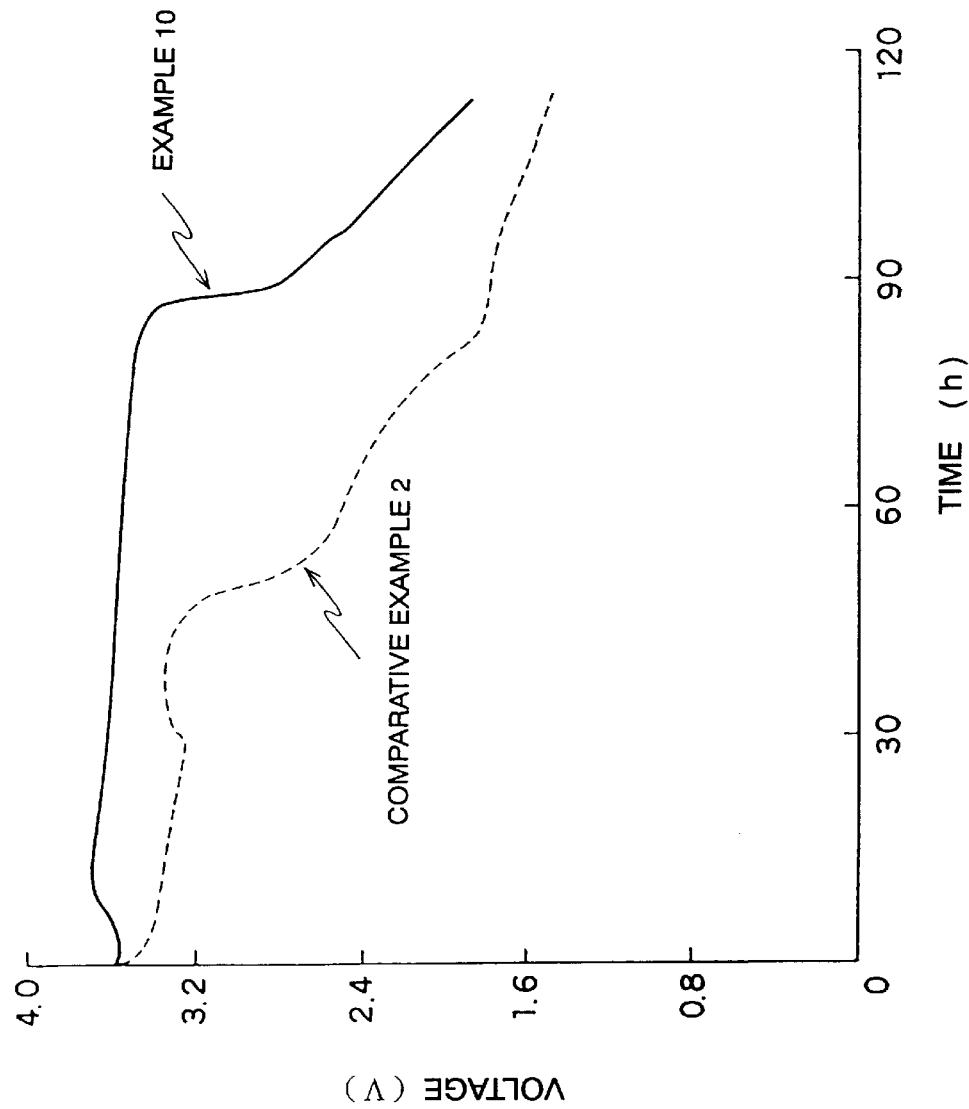
FIG. 4 shows discharge curves of the batteries obtained in Example 10 of the present invention and Comparative Example 2.

A constant current discharge was carried out at 200 μA at 60° C. by using the batteries of Example 7 and Comparative Example 1. The results are shown in FIG. 3. Also a constant current discharge was carried out at 300 μA at 60° C. by using the batteries of Example 10 and Comparative Example 2. The results are shown in FIG. 4.

As it is seen from the discharge curves at 60° C. of Example 7 and Comparative Example 1 (FIG. 3) and Example 10 and Comparative Example 2 (FIG. 4), when the electrolyte of the present invention is used, no battery deterioration occurs and stable high voltage discharge and high electric capacity can be obtained. On the other hand, in Comparative Examples 1 and 2 using a conventional electrolyte, significant deterioration occurred at 60° C.

INDUSTRIAL APPLICABILITY

According to the present invention, electrolyte which can prevent deterioration of an electric energy generator and give stable discharge and high electric capacity can be obtained.

What is claimed is:
1. An electrolyte which contains a lithium salt as a solute and at least one selected from the group consisting of dihalodicarbonyl compounds represented by the formula (I):

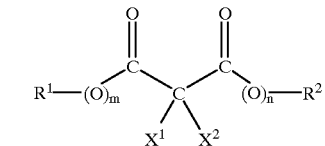

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1, and the formula (I'):

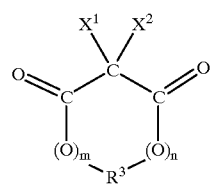

wherein $X^1$ and $X^2$ are the same or different halogen atoms, $R^3$ is an alkylene chain or haloalkylene chain having 1 to 6 carbon atoms which contains or does not contain oxygen atom in its chain, each of m and n is independently 0 or 1.

2. The electrolyte of claim 1, which is used for an electric energy generator in which an active material for negative electrode is a metal, metal alloy, metal oxide, carbonaceous material or organic polymer.

3. The electrolyte of claim 1, which is used for an electric energy generator in which an active material for positive electrode is a metal oxide, metal chalcogenide, metal halogenide, carbonaceous material, organic polymer or compound having N—F bond.

4. An electric energy generator which comprises an active material for positive electrode, an active material for negative electrode and an electrolyte containing a lithium salt as a solute and at least one selected from the group consisting of dihalodicarbonyl compounds represented by the formula (I):

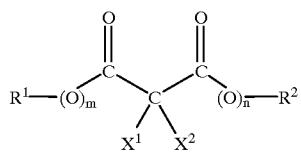

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1, and the formula (I'):

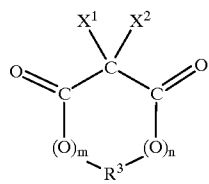

wherein $X^1$ and $X^2$ are the same or different halogen atoms, $R^3$ is an alkylene chain or haloalkylene chain having 1 to 6 carbon atoms which contains or does not contain oxygen atom in its chain, each of m and n is independently 0 or 1.

5. An electrolyte which contains a lithium salt as a solute and at least one selected from the group consisting of dihalodicarbonyl compounds represented by the formula (I):

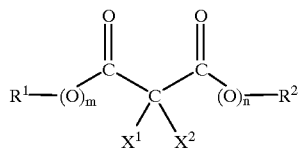

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1 with the proviso that at least one of m and n is 1, and the formula (I'):

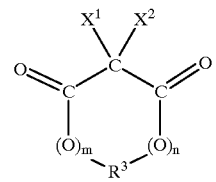

wherein $X^1$ and $X^2$ are the same or different halogen atoms, $R^3$ is an alkylene chain or haloalkylene chain having 1 to 6 carbon atoms which contains or does not contain oxygen atom in its chain, each of mn and n is independently 0 or 1.

6. An electric energy generator which comprises an active material for positive electrode, an active material for negative electrode and an electrolyte containing a lithium salt as a solute and at least one selected from the group consisting of dihalodicarbonyl compounds represented by the formula

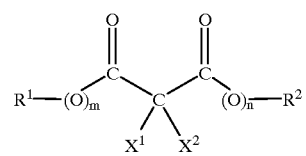

wherein $X^1$ and $X^2$ are the same or different halogen atoms, $R^1$ and $R^2$ are independently an alkyl group, haloalkyl group, alkoxyalkyl group or haloalkoxyalkyl group having 1 to 6 carbon atoms, an aryl-substituted alkyl group or haloaryl-substituted alkyl group having 7 to 10 carbon atoms or an aryl group or haloaryl group having 6 to 10 carbon atoms, each of m and n is independently 0 or 1 with the proviso that at least one of m and n is 1, and the formula (I'):

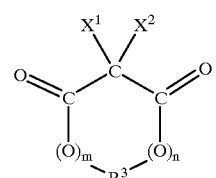

wherein $X^1$ and $X^2$ are the same or different halogen atoms, $R^3$ is an alkylene chain or haloalkylene chain having 1 to 6 carbon atoms which contains or does not contain oxygen atom in its chain, each of m and n is independently 0 or 1.

* * * * *

UNITED STATES PATENT AND TRADEMARK OFFICE
CERTIFICATE OF CORRECTION

PATENT NO. : 6,174,628
DATED : January 16, 2001
INVENTOR(S) : Teruo Umemoto, et al.

It is certified that error appears in the above-identified patent and that said Letters Patent is hereby corrected as shown below:

In the cover page, left-hand column, add:

-- (22) PCT Filed:  March 25, 1998

(86) PCT No.:  PCT/JP98/01353
      §371 Date:  Jan. 25, 1999
      §102(e) Date:  Jan. 25, 1999

(87) PCT Pub. No.:  WO98/57385

PCT Pub. Date:  Dec. 17, 1998 --

Column 1, line 6, delete "This application is a 371 PCT/JP98/01353."

Signed and Sealed this

Twenty-ninth Day of May, 2001

Attest:

NICHOLAS P. GODICI

Attesting Officer      Acting Director of the United States Patent and Trademark Office